(No Model.)

W. H. & F. C. BURDEN.
JOURNAL LUBRICATOR.

No. 327,519. Patented Oct 6, 1885.

WITNESSES
M. E. Fowler
Edward G. Siggers

INVENTORS
W. H. Burden and
F. C. Burden
By their Attorneys
C. A. Snow & Co.

United States Patent Office.

WILLIAM H. BURDEN AND FREDRICK C. BURDEN, OF CLEVELAND, OHIO.

JOURNAL-LUBRICATOR.

SPECIFICATION forming part of Letters Patent No. 327,519, dated October 6, 1885.

Application filed March 13, 1885. Serial No. 158,697. (No model.)

*To all whom it may concern:*

Be it known that we, WILLIAM H. BURDEN and FREDRICK C. BURDEN, citizens of the United States, residing at Cleveland, in the county of Cuyahoga and State of Ohio, have invented a new and useful Improvement in Journal-Lubricators, of which the following is a specification, reference being had to the accompanying drawings.

Our invention relates to an improvement in journal-lubricators; and it consists in the peculiar construction and combination of devices that will be more fully set forth hereinafter, and particularly pointed out in the claims.

Figure 1:
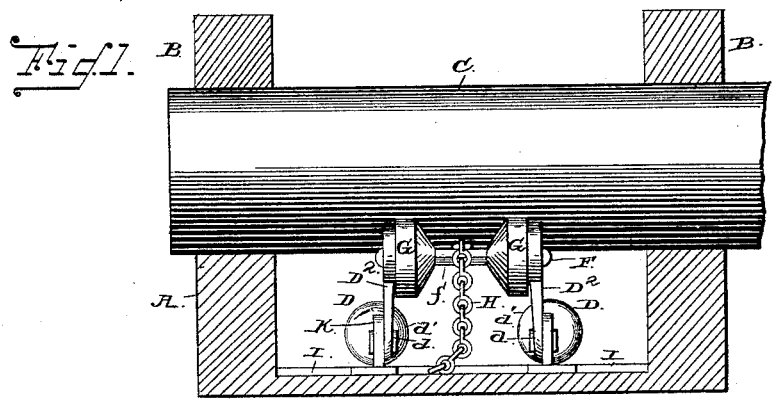
Figure 2:
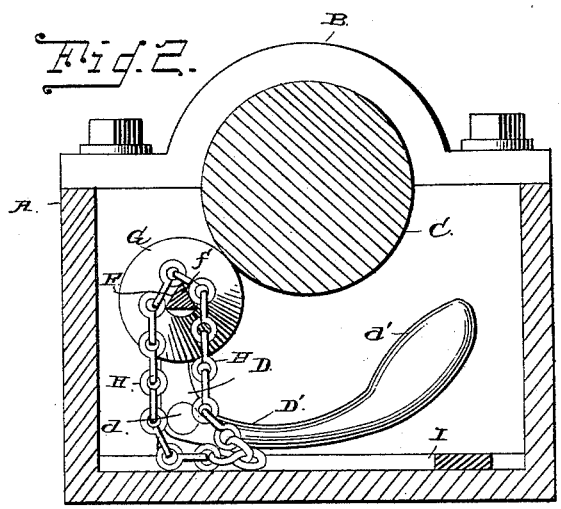
Figure 3:
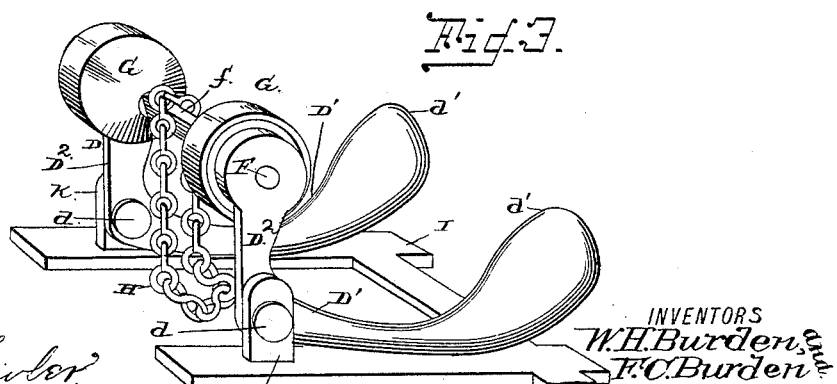

In the accompanying drawings, Figure 1 is a side elevation, partly in section, of a journal-lubricator embodying our invention. Fig. 2 is a vertical transverse sectional view of the same. Fig. 3 is a detailed perspective view of the frame and the arms and rollers attached thereto.

A represents a journal-box having the bearings B. In these bearings is journaled the shaft or axle C, which extends through the box, as shown. In the bottom of the journal-box is placed a rectangular metallic frame, I, which has vertical lugs K projecting from one side, to which are pivoted the bent arms D, as at $d$. These bent arms have horizontal portions D', that are weighted, as at $d'$, and vertical portions D², in the upper ends of which is journaled a shaft, F, which may be either hollow or solid, and to which, near its ends, are fixed the rollers G. The portion $f$ of the shaft between the rollers is angular, as shown, and around this angular portion of the shaft is passed an endless chain, H, that reaches to the bottom of the journal-box. The rollers G bear against the shaft or axle, being held in contact therewith by the weighted ends of the bent pivoted arms in which the rollers are journaled.

The operation of our invention is as follows: The lubricant is poured into the journal-box. The rotation of the shaft C causes the rollers G, which bear against it, to revolve, and thus operate the endless chain. As the chain passes over the angular portion of the shaft F it conveys the lubricant to the shaft F, and the lubricant is diffused to the rollers, and by their contact with the shaft conveyed thereto, as will be very readily understood.

As herein described and shown, only two rollers are employed which bear against the shaft; but, if preferred, others may also be employed and caused to bear on the opposite side of the shaft.

A journal-lubricator thus constructed is adapted to be used for car-axles or for shafts of any kind, is efficient in operation, and is not likely to get out of order.

Having thus described our invention, we claim—

1. The combination of the journal-box and the shaft or axle with the shaft carrying a set of rollers working against the axle and a loose endless chain working on the roller-shaft between the rollers to carry up the lubricant, as set forth.

2. The combination of the journal-box and the shaft or axle with the rollers mounted on a separate shaft, which is formed angular between the rollers, and an endless chain working around the angular portion of the shaft to deliver lubricant thereto and diffuse it toward the rollers, as set forth.

3. The combination of the journal-box, the shaft or axle journaled therein, the pivoted weighted arms, the rollers journaled therein and bearing against the shaft, and the endless chain passing over the roller-shaft, for the purpose set forth, substantially as described.

4. The combination of the journal-box, the shaft or axle journaled therein, the frame located in the journal-box, the bent weighted arms pivoted to said frame, rollers journaled in said arms and bearing against the shaft or axle, and the endless chain on the roller-shaft, for the purpose set forth, substantially as described.

In testimony that we claim the foregoing as our own we have hereto affixed our signatures in presence of two witnesses.

WILLIAM H. BURDEN.
FREDRICK C. BURDEN.

Witnesses:
GEO. HESTER,
A. J. HAMILTON.